United States Patent
Kuybeda et al.

(10) Patent No.: US 11,544,918 B2
(45) Date of Patent: Jan. 3, 2023

(54) VEHICLE TO INFRASTRUCTURE SYSTEM AND METHOD WITH LONG WAVE INFRARED CAPABILITY

(71) Applicant: Adasky, Ltd., Yokneam Illit (IL)

(72) Inventors: Oleg Kuybeda, Portland, OR (US); Yonatan Dishon, Haifa (IL); Igor Ivanov, Haifa (IL)

(73) Assignee: Adasky, Ltd., Yokneam Illit (IL)

( * ) Notice: Subject to any disclaimer, the term of this patent is extended or adjusted under 35 U.S.C. 154(b) by 73 days.

(21) Appl. No.: 17/138,054

(22) Filed: Dec. 30, 2020

(65) Prior Publication Data
US 2022/0207279 A1    Jun. 30, 2022

(51) Int. Cl.
| | |
|---|---|
| *G06V 10/30* | (2022.01) |
| *G06V 10/98* | (2022.01) |
| *G06T 7/80* | (2017.01) |
| *H04N 7/18* | (2006.01) |
| *G06V 10/143* | (2022.01) |
| *G06V 20/54* | (2022.01) |

(52) U.S. Cl.
CPC ............ *G06V 10/98* (2022.01); *G06T 7/80* (2017.01); *G06V 10/143* (2022.01); *G06V 10/30* (2022.01); *G06V 20/54* (2022.01); *H04N 7/183* (2013.01)

(58) Field of Classification Search
CPC ........ G06V 10/98; G06V 20/54; G06V 10/30; G06V 10/143; G06T 7/80; G06T 5/0002; G06T 5/20; G06T 2207/30252; G06T 2207/10048; H04N 7/183
See application file for complete search history.

(56) References Cited

U.S. PATENT DOCUMENTS

| | | | |
|---|---|---|---|
| 7,995,859 B2 | 8/2011 | Högasten | |
| 10,511,793 B2 | 12/2019 | Kuybeda et al. | |
| 2008/0278607 A1 | 11/2008 | Zhang et al. | |
| 2011/0220797 A1 | 9/2011 | Hoelter et al. | |
| 2014/0240512 A1* | 8/2014 | Hogasten | H04N 5/262 348/164 |
| 2014/0313343 A1 | 10/2014 | Frank et al. | |
| 2015/0298657 A1* | 10/2015 | Kanter | H04N 17/002 348/148 |

(Continued)

OTHER PUBLICATIONS

International Search Report and Written Opinion of International Searching Authority for PCT/IB2021/060944, ISA/IL, Jerusalem, Israel dated Feb. 24, 2022.

*Primary Examiner* — Syed Haider
(74) *Attorney, Agent, or Firm* — M&B IP Analysts, LLC (57) ABSTRACT

A system and method for operating a Vehicle to Infrastructure (V2I) system. The method includes receiving images from an infrared (IR) camera, determining whether a non-uniform noise exists within the received images, performing a calibration, upon determining that the non-uniform noise exists, performing a Non-Uniformity Correction (NUC) on the IR, upon determining that there is residual non-uniform noise, after performing the calibration, and determining that the IR camera has not detected a moving object that is approaching the IR camera, determining whether a Field of View (FOV) of the IR camera is occluded, after performing the NUC, and cleaning the IR camera, upon determining that the FOV of the infrared camera is occluded.

20 Claims, 7 Drawing Sheets

(56) References Cited

U.S. PATENT DOCUMENTS

| | | | |
|---|---|---|---|
| 2015/0332441 A1* | 11/2015 | Högasten | G06K 9/0051 |
| | | | 348/148 |
| 2018/0300884 A1 | 10/2018 | Schulte et al. | |
| 2019/0020791 A1 | 1/2019 | Kuybeda et al. | |
| 2020/0116499 A1* | 4/2020 | Jung | G08G 1/167 |
| 2020/0143517 A1 | 5/2020 | Zhou et al. | |
| 2020/0204732 A1* | 6/2020 | Yadav | G06T 3/4038 |

* cited by examiner

VEHICLE TO INFRASTRUCTURE SYSTEM AND METHOD WITH LONG WAVE INFRARED CAPABILITY

TECHNICAL FIELD

The present disclosure relates generally to vehicle communication system, particularly to a vehicle to infrastructure system and method involving an infrared camera.

BACKGROUND

Vehicle-to-Infrastructure (V2I) is a communication model that allows vehicles to share information with the infrastructures and components that make up a road system. The components may include traffic lights, lane markers, streetlights, road signs, parking meters, building structures, or the like. Data may be gathered in real-time from sensors mounted on these components and sent to a vehicle over a network to deliver warnings on road conditions, traffic congestion, potential obstacles, and parking availability. Other systems may also use both infrastructure and vehicle data to optimize traffic flow and increase fuel economy of vehicles, while promoting safety to both the driver and the pedestrians on the road.

Typically, sensors used in V2I system include video cameras, Radio Detection and Ranging (RADAR), ultrasonic sensors, and Light Detection and Ranging (LIDAR), and other stationary sensors mounted at fixed locations with good visibility of traffic objects outside of moving vehicles. V2I systems may also add to information that cannot be adequately captured by sensors mounted on a vehicle. For example, a V2I system may include an RGB camera mounted on a pole at an intersection that is adapted to capture and analyze videos of vehicles and pedestrians approaching the intersection, and transmit the information to vehicles approaching from around the corner.

Since V2I systems are stationary and are not placed on vehicles, and cost of the systems may be shared by the members of the public that use these systems, rather than by individual vehicle owners, V2I systems may augment the analytical capabilities of sensors mounted on vehicles in Vehicle-to-Vehicle (V2V) systems by having sensors mounted at view angles and positions, with increased sensor sensitivities, enhanced resolutions, increased detection ranges, and larger field of view, without limitations to size, position location, and cost restrictions that would apply to V2V systems that are installed on individual vehicles.

However, the various sensing modalities are limited in their field of view, and are unable to perform in all-weather conditions. The performance of these devices is particularly poor under foul weather or at night. For example, even during fair weather conditions under bright daylight, video cameras may be rendered useless by glare from sunlight and snow reflection. Also, at night, additional active lighting is necessary for the video camera to discern objects far away, which consume much electrical energy. Further, video cameras may not be useful under heavy rain or fog.

Radar, while being able to discern relative speed of objects, is unable to discern details of the objects. Further, ultrasonic sensors can only sense nearby object, and at low resolution. Additionally, while LIDAR may be able to create three dimensional images of objects and give depth perception, the range is still limited, and sensing may be obfuscated in rainy or foggy conditions.

Overall, the various systems described do not work well under compromised weather conditions or at night.

Additionally, when imagers of different modalities are fixed on an infrastructure for an extended period of time, as is the case in V2I applications, noise may build up in the image produced that degrade the quality of the image, making it difficult for the onboard processors to distinguish different objects that are detected over time.

In view of the above discussion, there is a need for a V2I system using a different modality that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for operating a Vehicle to Infrastructure (V2I) system. The method includes receiving images from an infrared (IR) camera, determining whether a non-uniform noise exists within the received images, performing a calibration, upon determining that the non-uniform noise exists, performing a Non-Uniformity Correction (NUC) on the IR, upon determining that there is residual non-uniform noise, after performing the calibration, and determining that the IR camera has not detected a moving object that is approaching the IR camera, determining whether a Field of View (FOV) of the IR camera is occluded, after performing the NUC, and cleaning the IR camera, upon determining that the FOV of the infrared camera is occluded.

Certain embodiments disclosed herein also include a non-transitory computer readable medium having stored thereon causing a processing circuitry to execute a process, the process includes receiving images from an infrared (IR) camera, determining whether a non-uniform noise exists within the received images, performing a calibration, upon determining that the non-uniform noise exists, performing a Non-Uniformity Correction (NUC) on the IR, upon determining that there is residual non-uniform noise, after performing the calibration, and determining that the IR camera has not detected a moving object that is approaching the IR camera, determining whether a Field of View (FOV) of the IR camera is occluded, after performing the NUC, and cleaning the IR camera, upon determining that the FOV of the infrared camera is occluded.

Certain embodiments disclosed herein also include a Vehicle to Infrastructure system. The system includes a processing circuitry, and a memory, the memory containing instructions that, when executed by the processing circuitry, configure the system to receive images from an infrared (IR) camera, determine whether a non-uniform noise exists within the received images, perform a calibration, upon determining that the non-uniform noise exists, perform a Non-Uniformity Correction (NUC) on the IR, upon determining that there is residual non-uniform noise, after performing the calibration, and determining that the IR camera has not detected a moving object that is approaching the IR camera, determine whether a Field of View (FOV) of the IR camera is occluded, after performing the NUC, and clean the IR camera, upon determining that the FOV of the infrared camera is occluded.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for operating a Vehicle to Infrastructure (V2I) system using a long wave infrared camera. The use of infrared camera allows for detection of moving objects, such as vehicles and pedestrians from long range (up to about 250 m), without need for active lighting, which uses up a lot of energy and creates optical noise for sensors. The image produced by long wave infrared camera is also invariant to other light sources, haze, night light, rain, snow, fog, or other factors that may decrease visibility for other types of imaging systems, such as Light Detection and Ranging (LIDAR). The V2I method and system also includes image processing that enhances both object detection, tracking, and distance determination, which is optimized for camera that is stationary and fixed on a pole. Further a shutter mechanism may be used to close the field of view of the camera and perform critical camera maintenance when the infrared camera is not in use. Therefore, an algorithm may be developed to determine when the shutter may be closed.

Figure 1:
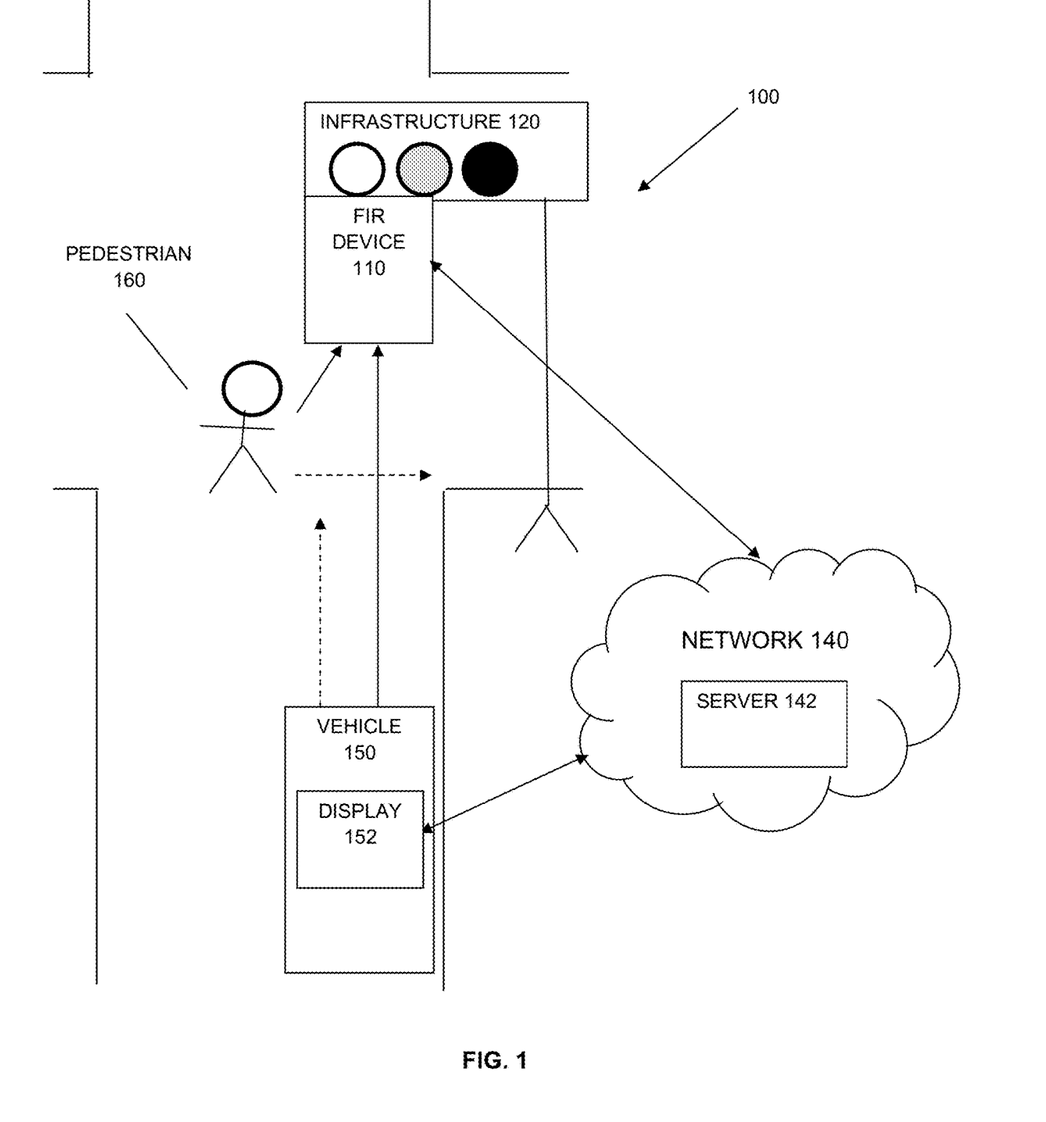
FIG. 1 is a schematic diagram of a Vehicle to Infrastructure (V2I) communication system using an infrared camera, according to an embodiment herein.

FIG. 1 is a schematic diagram of a Vehicle to Infrastructure (V2I) communication system 100 using a Far Infrared (FIR) device 110, according to an embodiment herein. The V2I communication system 100 includes the FIR device 110, an infrastructure 120, a terminal (not shown), a network 140, and a display 152 located in a vehicle.

The FIR device 110 may be mounted on the infrastructure 120, or independently on its own mount in a fixed position. The FIR device 110 is adapted to detect far infrared spectrum of electromagnetic radiation at a wavelength of about 15 micrometers to 1 mm, which also corresponds to a range of 20 THz to 300 GHz.

The infrastructure 120 may be, but is not limited to, traffic camera, road signs, streetlights, buildings, bridges, toll booths, car parks, charging stations, road markings, and other transportation equipment.

The network 140 may be, but is not limited to, a wireless, cellular or wired network, a local area network (LAN), a wide area network (WAN), a metro area network (MAN), the Internet, the worldwide web (WWW), similar networks, and any combination thereof. The network 140 may also include a cellular network, e.g., an LTE or a 5G. Also connected to network 140 is a server 142. The display 152 may be a screen in the vehicle.

In operation, the FIR device 110 mounted on the infrastructure 120 successively captures an image of the pedestrian 160 crossing an intersection and a vehicle 150 approaching the intersection. Besides images, whether by itself or in combination with other sensors, the FIR device 110 may also capture other information associated with both the vehicle and the pedestrian. The FIR device 110 then transfers the image information to the server 142 over the network 140 for processing.

Figure 2:
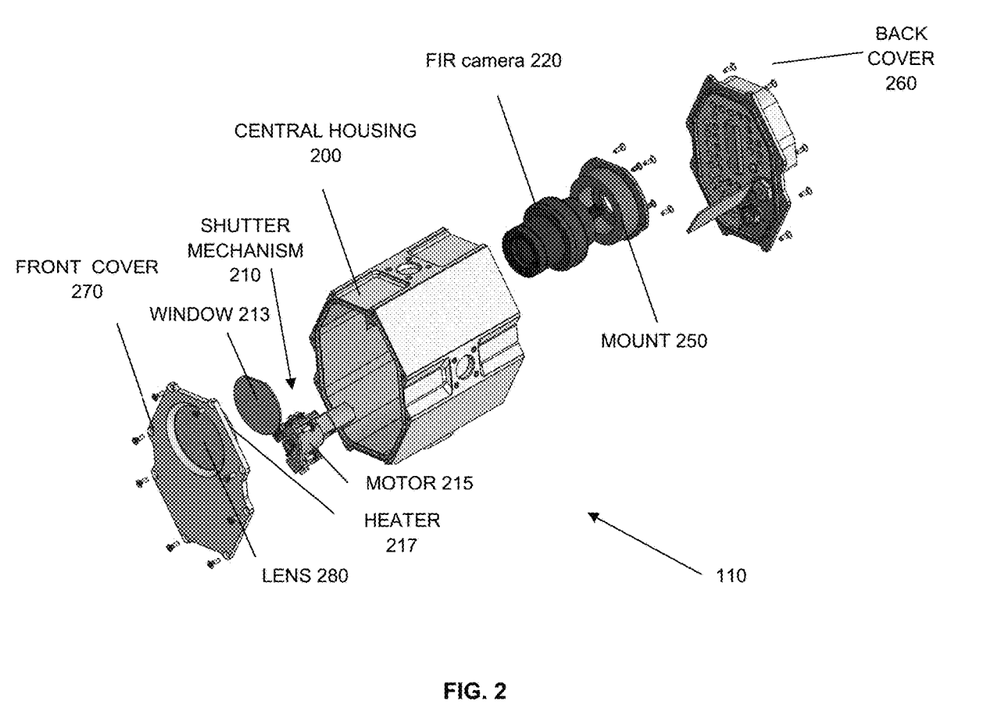
FIG. 2 is an exploded view of the infrared camera used in the V2I communication system, according to an embodiment herein.

FIG. 2 is an example exploded view of the FIR device 110 used in the V2I communication system 100, according to an embodiment herein. The FIR device 110 includes a central housing 200 enclosing a shutter mechanism (shutter) 210, or a Non-Uniformity Correction (NUC) mechanism, a FIR camera 220, and a mount 250. The mount 250 is fixed on a back cover 260 on a proximal end of the FIR device 110, and a front cover 270 encloses a distal end of the FIR device 110 opposite the proximal end.

The shutter 210 is designed to protect the FIR camera 220, and includes a window 213 and a motor 215. The motor 215 moves the window 213 to cover the Field of View (FOV) of the FIR camera 220 when performing camera maintenance or resource-intensive image processing. The window 213 may also cover the FIR camera 220 when on standby status, when the FIR sensor 220 has not detected any moving objects such as vehicles or pedestrians over a period of time.

The shutter 210 may also be activated automatically to conduct NUC operations upon power-up, or when the image quality degrades severely and cannot be corrected when the shutter 210 does not close and cover the FOV of the FIR camera 220. For example, when it is detected that the images captured by the FIR camera 220 is noisy, the shutter 210 activates to conduct NUC operations, and calibrations may be performed.

That is, during NUC operations when calibrations are taking place, the shutter 210 may be moved by the motor 215 to a "closed" position, where the FIR sensor 220 is blocked by the shutter 210 so that NUC operations could occur to take corrective actions without outside disturbance.

Alternatively, the shutter 210 along with the NUC operation may be manually operated.

The front cover 270 includes a lens 280. A de-icing window heater (heater) 217 which may include a wire or a coil, also exists between the lens 280 and the window 213. The heater 217 prevents icing of the lens 280 and protects the components of the FIR camera 220. Also, in an embodiment, the lens 280 may be made of a low conductivity material that is also transparent to electromagnetic waves in the IR range, so that electrical currents can be applied directly to heat the lens, without the need for a separate heater 217. For example, a material such as germanium may be used to form the lens 280. In some embodiments, the lens 280 may also have a diamond-like carbon (DLC) coating. Further, the lens using germanium and other semiconductors with similar electro-thermal conductive properties may be doped (e.g., N-type or P-type semiconductors) to control the material's conductivity.

The heater 217 is powered and controlled by a developer kit via a heater relay of the a controller of FIR device 110 (not shown). The heater 217 may be powered up by the heater relay 138 based on temperature sensing of the window 213. For example, the heater 217 may be triggered when the sensed temperature falls below about 5C (41*f*), and once triggered, the heater 217 stops heating when the temperature rises above about 14C (57*f*).

Figure 3:
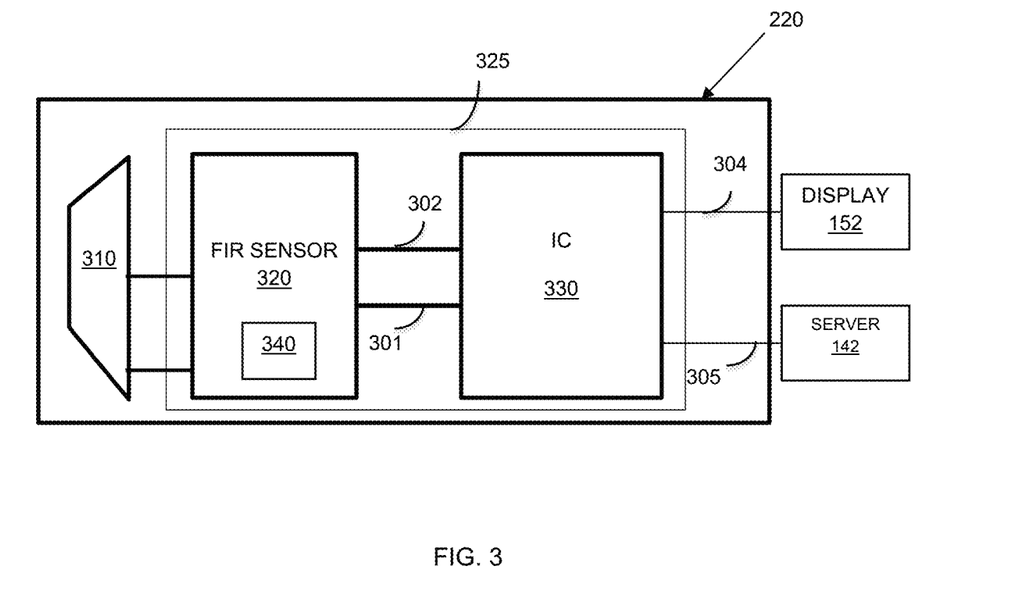
FIG. 3 is a detailed schematic diagram of the infrared camera system used in the V2I communication system, according to an embodiment herein.

FIG. 3 is an example block diagram side-view of an FIR camera 220 implemented according to an embodiment. The FIR camera 220 includes an optical unit 310 and the FIR sensor 320 coupled to the integrated circuit (IC) 330. The output of the FIR camera 220 is a video stream of thermal images (thermal video stream) captured by the FIR sensor 320 and processed by the IC 330.

In an embodiment, two thermal video streams are output by the FIR camera 220. A first stream 304 may include thermal images captured by the FIR camera 220 and processed by the IC 330 for the image correction and enhancement. In an example embodiment, the first thermal video stream 304 may be an 8-bit grayscale video stream. The first thermal video stream 304 is fed to the display 152. In a further embodiment, multiple thermal video streams are output by the FIR camera 220. The output streams may include results from images received from non-FIR sensors, (e.g., visible wavelength, CCD, or CMOS sensors).

A second stream 305 includes thermal images captured by the FIR sensor 320 and processed by the IC 330 for NUC correction. In an example embodiment, the second thermal video stream 305 is a 14-bit data stream. The second stream 305 is fed to a server 142 for computer vision processing. Specifically, the server 142 may be configured to execute various computer vision algorithms related to AVS and other autonomous systems and applications. The algorithms may include, but are not limited to, detection of objects, obstacles, or hazards on a road. For example, the processed thermal video stream as output by the FIR camera 220 can be utilized for the detection of vehicles, pedestrians, animals, two-wheelers, black-ice spots, litter, debris, potholes, gully covers, curbs and so on. In an embodiment, the server 142 may be an onboard vehicle computer or a dedicated computer installed in the vehicle (not shown). In some example embodiments, the computer may be a virtual or physical computing machine operable in a cloud computing platform (not shown).

As will be discussed below, according to some embodiments, the processing performed by the IC 330 is configured to enhance the quality of the captured thermal images to allow for accurate and fast detection of objects, obstacles, and hazards on the road. The processing by the IC 330 ensures passive detection of objects during day and night lighting conditions and at all weather conditions. To this end, the IC 330 is configured to perform one or more image processing tasks. Such tasks include, but are not limited to, NUC, sunburn protection, bad pixel replacement, near field correction, temporal denoising, spatial denoising, edge enhancement, automatic gain control, local contrast, enhancement, and brightness and polarity adjustment. In an embodiment, these tasks are performed in a pipeline manner where some or all the tasks may be utilized to process a FIR image (frame), thus ensuring low latency processing.

An image processing that may be performed by the IC 330 is the shutterless correction of FIR images captured by the FIR sensor 320. In one embodiment, the FIR camera 220 may not include any shutter (or any moving part that can be viewed as shutter). The shutterless correction executed by the IC 330 allows the performance of a flat-field correction without any shutter. That is, shutterless correction allows for a uniform FIR image. In cases where the shutterless image processing fails to provide correction of FIR images, however, (e.g., where there is rapid ambient change) and given the static placement of the FIR camera 220, a shutter may be used as a back-up to allow for the system to perform more resource-intensive correction. In this case, the method of shutterless correction may lengthen the time between shutter invocations by processing simple corrections while keeping the shutter open and allowing the FIR camera 220 to keep recording images.

It should be appreciated that the shutterless FIR camera 220 may be mechanically more reliable and better meets safety standards required for AVS systems. Therefore, time required in keeping the shutter open while imaging, in cases where the image captured is not noisy or occluded, where minimal processing is needed, and keeping the shutter from having to close may result in optimum reliability and safety in the V2I setting. However, shutterless correction methods are more computationally demanding, which may require more powerful processor/accelerator, whereas as shutter-based correction is usually very basic that can be performed on-the-fly by less-sophisticated light circuits, on-chip, FPGA, small controller, which can even be part of the detector circuitry.

In an embodiment, the optical unit 310 includes one or more lens elements, each of which having a predetermined field of view (FOV). For example, the FOV of these lens elements may range from around 30-60 degrees. In an embodiment, the lens elements are chalcogenide. The lens may be protected by a protective window (not show in FIG. 3).

In an embodiment, the FIR camera 220 may include multiple optical units 310. Each optical unit 310 may be used independently or may be used in conjunction with one or more other optical units 310. For example, a single FIR sensor 320 may be connected to two or more optical units 310. Further, in an embodiment, multiple FIR sensors 320 may be connected to a single IC 330.

In an example embodiment, the multiple optical units 310 and/or multiple FIR sensors 320 may be used in tandem to capture and create a resulting image with a higher final resolution than a single optical unit 310 or FIR sensor 320 may otherwise provide. As an example, two VGA (640 pixels×480 pixels) sized FIR sensors 320 may be used to capture a single 1280 pixels×480 pixels FIR image. The IC 330 may be configured to automatically stitch two adjacent images together and may apply all of the corrections discussed herein to the final composite image. Alternatively, each individual image may be first corrected, and then stitched together. In a further embodiment, the images are not stitched, but rather concatenated horizontally or vertically when output to a display or to a computer. In yet a further embodiment, the multiple optical units 310 or FIR sensors 320 may be used for stereo vision applications, or to provide multiple view angles of a scene.

In yet a further embodiment, multiple image streams are received and processed by the FIR camera 220. Such embodiments may include creating an output stream that is a fusion of the multiple video streams, including different imaging modalities e.g., a fusion of FIR images with a visible-spectrum image, a fusion of FIR images having various focal lengths, and the like. Any number of input streams may be received and processed to produce the fused output stream.

The FIR sensor 320 may be an uncooled FIR sensor. That is, the sensor 320 operates in the FIR spectrum with a wavelength of 7.0-14.0 μm. In an example, the FIR sensor 320 is coupled through a first bus 301 to the IC 330 to input the captured FIR images and metadata. In an embodiment, a junction temperature sensor (temp sensor) 340 is included in an enclosure of the FIR sensor 320 to measure the junction temperature therein.

A control bus 302 is also connected between the FIR sensor 320 and the IC 330. On the bus 302, signals related to status of the sensor 320, clock, synchronization, and other digital control signals are transferred. In an embodiment, the bus 302 may carry analog signals indicating, for example, the current ambient temperature at the FIR sensor 320. Alternatively, the analog signal may not be part of the control bus 302.

The IC 330 includes a memory, a processing circuitry, and various circuits, engines, and engines allowing the execution of the tasks noted herein. A detailed block diagram of the IC 330 is provided in FIG. 4. The IC 330 may be realized as a chipset, a System on a Chip (SoC), a Field Programmable Gate Array (FPGA), a Programmable Logic Device (PLD), an application specific integrated circuit (ASIC) or any other type of digital and/or analog hardware components.

The IC 330, and hence the FIR camera 220, operates in four different modes: calibration, a power-on-test, a function, and a standby. The calibration mode is performed at a lab where the IC 330 executes a calibration process based on the previous calibration points. During the process, the FIR camera 220 is stabilized at a predefined temperature and both the FPGA and ambient temperatures are periodically read from the FIR sensor 320 to determine temperature stability.

In the power-on-test mode, the FIR camera 220 is checked, during its power-up, if the various circuits of the IC 330 operate properly. This includes, for example, performing internal self-tests for memories, logic monitors, digital and analog components. In the functional mode, the IC 330 performs image processing tasks and communicates with external systems and components (e.g., sensor and computer). In the standby mode, no image processing is performed but only communication with the external systems and components. The standby mode may be activated when the vehicle is not in motion.

The FIR sensor 320 and IC 330 are encapsulated in a thermal core 325. The thermal core 325 is utilized to ensure a uniform temperature for the FIR camera 220. The temperature calibration of the thermal core is performed during the calibration mode. In another embodiment, the thermal core may also be placed within the central housing 200, the front cover 270, and the back cover 260 to protect the components of the FIR device 110 from heat, cold, and can be made to waterproof the components.

Figure 4:
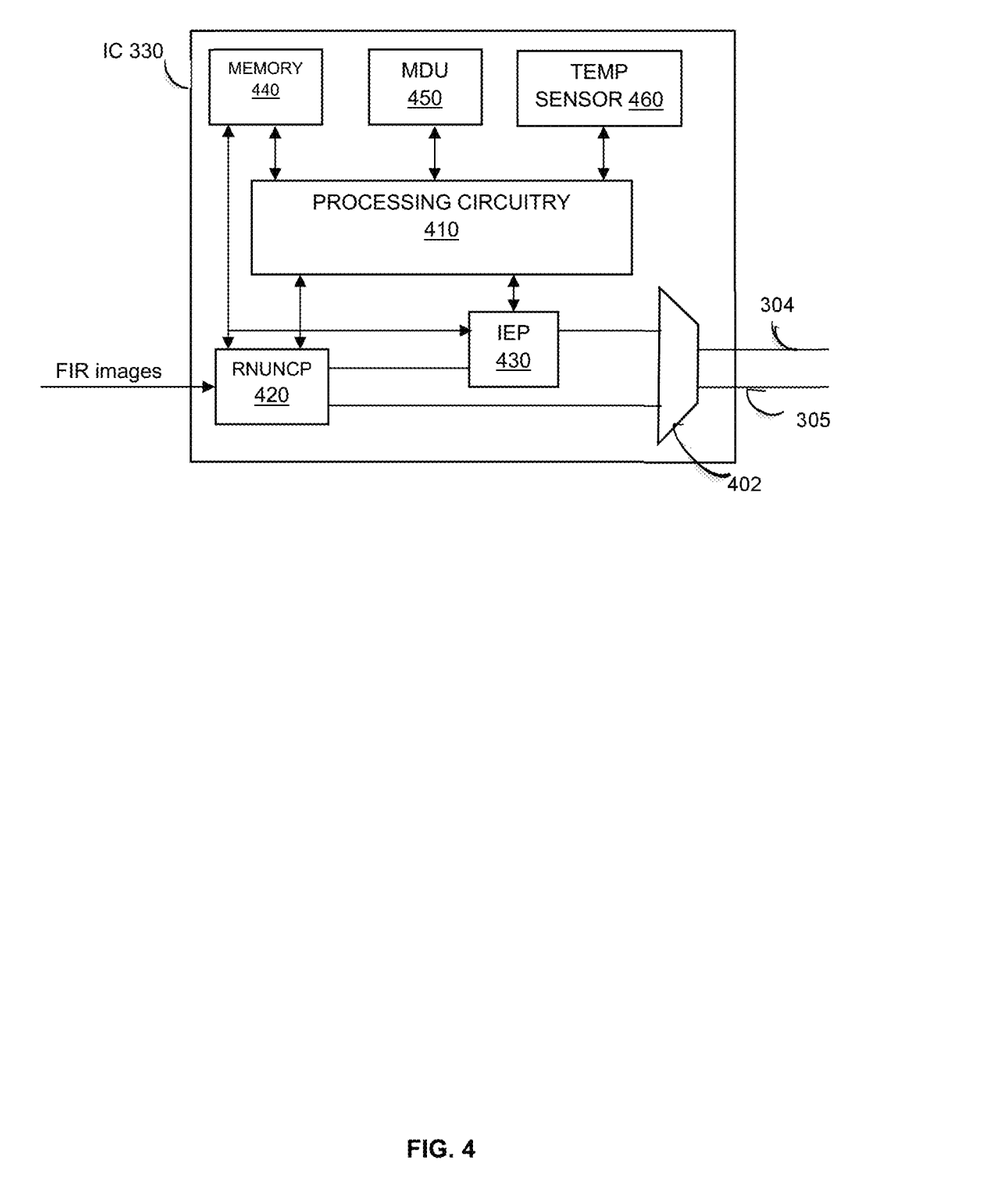
FIG. 4 is a detailed schematic diagram of the (processing circuit/server) used in the V2I communication system, according to an embodiment herein.

FIG. 4 show an example block diagram of the IC 330 designed according to one embodiment. The IC 330 includes a processing circuitry 410, a residual non-uniformity noise correction processor (RNUNCP) 420 and an image enhancing processor (IEP) 430 that are configured to execute the various image processing tasks discussed herein. The IC 330 further includes a memory 440, and a temperature sensor 460.

The IC 330 interfaces with the external elements, such as the server 142 and display 152 through a multimedia link 402. In an example embodiment, the media link is a gigabit multimedia serial link (GMSL). As noted above, in one embodiment, the IC 330 can be configured to output two thermal video streams of FIR images: a first stream (304) is processed by the RNUNCP 420 and the IEP 430 and supplied to the display 152, and second stream (305) is processed by the RNUNCP 420 and supplied to server 142. Both thermal video streams are output via the multimedia link 402. In a further embodiment, a single thermal video stream is output to the server 142. For example, certain autonomous vehicle systems may not include a display, and thus only require input from the thermal video stream to the server 142.

In some optional embodiments, the IC 330 does not include the IEP 430. In such embodiments, correction is performed by the RNUNCP 420, and the output is fed to the server 142. A configuration of the FIR camera 220 without the IEP 430 can be utilized in autonomous vehicle systems where a display may not be required.

In an embodiment, the memory 440 is configured to store calibration tables. The calibration tables include at least various calibration values for each pixel computed in the lab during camera manufacturing. The calibration values may include the Gain and Offset calculated from two temperature points (T1, T2) for the purpose of overcoming the irregularities in the FIR sensor and unifying the pixels' response to IR radiation for a wide range of ambient temperatures. The calibration table also includes a drift value determined for each pixel at each temperature point during a calibration process. In an embodiment, the tables also store various parameters' values to set the FIR camera 220.

The memory 440 may further store computer readable instructions to be executed by the processing circuitry 410, the RNUNCP 420 and the IEP 430. The computer readable instructions shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, the RNUNCP 420 and/or IEP 430, cause these processors to perform the various embodiments and tasks described herein. The memory 440 may be volatile (e.g., RAM, etc.), non-volatile (e.g., ROM, flash memory, etc.), or a combination thereof.

In an optional configuration, the camera IC 330 includes a Motion Detection Unit (MDU) 450. The MDU 450 includes one or more accelerometers utilized to determine if the FIR camera 220 (and hence the vehicle) is in motion. When the MDU 450 is not utilized, a motion detection is based on the captured imaged. A motion indication is provided to the RNUNCP 420 and IEP 430. The temp sensor 460 measures the ambient temperature inside the enclosure of the FIR camera 220.

The processing circuitry 410 is configured to control the various elements of the IC 330. The circuitry 410 is further configured to power-up the FIR sensor 320, upload the initial calibration tables and set the FIR sensor 320 and the RNUNCP 420 and IEP 430 based on the parameters' values in such tables. In an embodiment, the circuitry 410 periodically samples the temperature as measured by the temp sensor 460, and uploads a set of calibration tables from the memory 440 that include calibration values for the measured temperature range. To allow for fast execution, some tables can be uploaded in the background, (i.e., during the processing of FIR images). The processing circuitry 410 further includes a shutter motor driver (driver) and a window heater relay (relay), both of which are not shown and which control the components of the FIR device 110. For example, the motor 215 of the shutter 210 may be powered and controlled by the motor driver of the processing circuitry 410.

In an embodiment, the RNUNCP 420 is configured to perform pixel-based corrections. The pixel-based correction corrects unmodeled offset, gain, drift, noise, or error for each pixel. In an embodiment, the offset and gain of a pixel are corrected based on the respective values in the calibration table matching a respective temperature as measured by the temp sensor 460. This correction compensates for the irregularities in the sensor and unify the pixels' response to IR radiation for a wide range of ambient temperatures.

The drift correction, which prolongs periods between shutter invocations in cases where the shutter is used during imaging, includes adding drift correction to each of the pixels. Specifically, correction for each pixel is a result of a subtraction of a pre-defined drift value provided from a loaded calibration table separately for each pixel, multiplied by a gamma value which is calculated from the frames produced by the FIR sensor. The pre-defined drift value is selected from the table based on the current measured temperature at the FIR sensor 320.

According to some embodiments, the drift correction is based on a temperature drift correction for each of the pixels in the images output the FIR sensor 320. This may be necessary if the temperature values of the FIR camera 220 as a whole, and the FIR sensor 320 and IC 330 individually, shift during operation.

The drift correction may be based on estimating a drift coefficient $\gamma$ using a drift pattern recorded during the calibration stage of the FIR camera 220. In an embodiment, estimation of the drift coefficient $\gamma$ is performed iteratively with small incremental updates based on each input image, so that any residual noise or new noise, e.g., due to ambient temperature shifts, is detected and removed with each subsequent image.

The ambient drift of an input image is corrected using the estimated drift coefficient $\gamma$. A drift corrected image (Iout) can be represented as follows:

$$Iout = Iin - \gamma \cdot D - O/G \quad (1)$$

Where Iin is the input image (produced by the FIR sensor 320); $\gamma$ is the drift coefficient, which is the same for all pixels; 'D' is the drift pattern, unique per pixel; 'O' is an offset gain pattern; and 'G' is the scene gain pattern value, unique per pixel, where D, O and G values are determined during initial calibration of the FIR sensor 320.

In some configurations, the gain and offset are corrected prior to the drift correction, in which case such values are not required to estimate the drift coefficient $\gamma$. Thus, a more generalized version of the drift correction calculation uses a 2-points corrected input image (I2pt), drift coefficient and the drift pattern from the calibration, and can be represented as the following equation:

$$Iout = I2pt - \gamma \cdot \hat{D} \quad (2)$$

In Eq. 2, D is the value of the drift pattern (D) divided by the gain pattern (G).

The drift coefficient $\gamma$ used for the correction is derived from the drift pattern from the initial calibration and the resulting pattern of drift within an input image after a high pass filter has been applied thereto.

A generalized equation for the drift coefficient is the quotient of the product of the drift pattern and the input image pixel values after applying a high pass filter thereto, and the product of the drift pattern and the drift pattern after applying a high pass filter thereto, represented by the following equation:

$$\gamma = \frac{\langle H\_1(D), H\_2(I_{in}) \rangle}{\langle H\_1(D), H\_2(D) \rangle} \quad \text{Eq. 3}$$

where H_1 and H_2 are pre-processing operators designed to minimize correlation between clean image of the scene and the drift pattern. Without loss of generality, these operators may include high pass filtering and masking. An example of such operations, without loss of generality, can be H_1=identity map and H_2=a high-pass filter.

In Equation 3 (Eq. 3), $\gamma$ is a scalar value obtained as a ratio of 2 inner products. Therefore, it is one value for all pixels at this stage. In an embodiment, the scalar value can be converted to a (slowly varying) value per pixel by using Eq. 3 on different segments of the image and interpolating results. An example for such embodiment is discussed below. By applying $\gamma$ in drift correction, the frequency of shuttering the FIR camera for image processing may be decreased, while keeping the FIR camera for longer period of time, thereby improving the reliability and safety performance of the FIR camera in the V2I setting.

In an embodiment, for V2I applications where the FIR device 110 position is fixed, only static images may be used for noise correction. This may be implemented by using a deep learning model that allows for separating an actual scene image from a fixed pattern noise pattern by training the model using a plurality of clean images. Here, the associated shutter invocation made during noise correction may be made "safe" or "smart" by preventing the camera shutter while critical tasks requiring a clear field of view for the FIR device 110 is performed. For example, when tracking a fast approaching vehicle, the shutter should be kept open, and fixed pattern noise correction may be skipped or delayed until the vehicle has passed the field of view of the FIR device 110.

In some cases, where there is a need to provide actual temperature measurement of the objects in a scene, the FIR device 110 can be adapted to convert the gray-level pixel values into temperature. In order to do that, the FIR device 110 may undergo a calibration procedure during manufacture, or at the scene. As an alternative, or as a supplement to the extrinsic calibration, one can use one or more black bodies, or a reference object, as a more precise temperature reference. The black body may be installed in a fixed position in the scene, attached to the detector window in front of the lenses, or in-between the lenses and the detector, so that the black body radiation is received by the detector pixels. These pixels may be in the visible image area, or hidden (i.e., redundant pixels exposed to the scene, or black body radiation, but not shown in the output image).

As will be discussed in detail below, the RNUNCP 420 implements a plurality of engines to execute corrections and other image enhancing tasks. In an embodiment, the scene-based correction also includes correcting pixels that suffer from "sunburn effect." Such an effect is caused by exposing the FIR camera to direct sun which brings the exposed pixels into deep saturation due to overexposure. The outcome of this effect is characterized by a ghost footprint of sun similar to a fixed pattern noise which may last for minutes or weeks, depending on the exposure time. According to the disclosed embodiment, the sunburn correction also removes ghost footprints from the image in a few seconds (e.g., 2-5 seconds).

Figure 5:
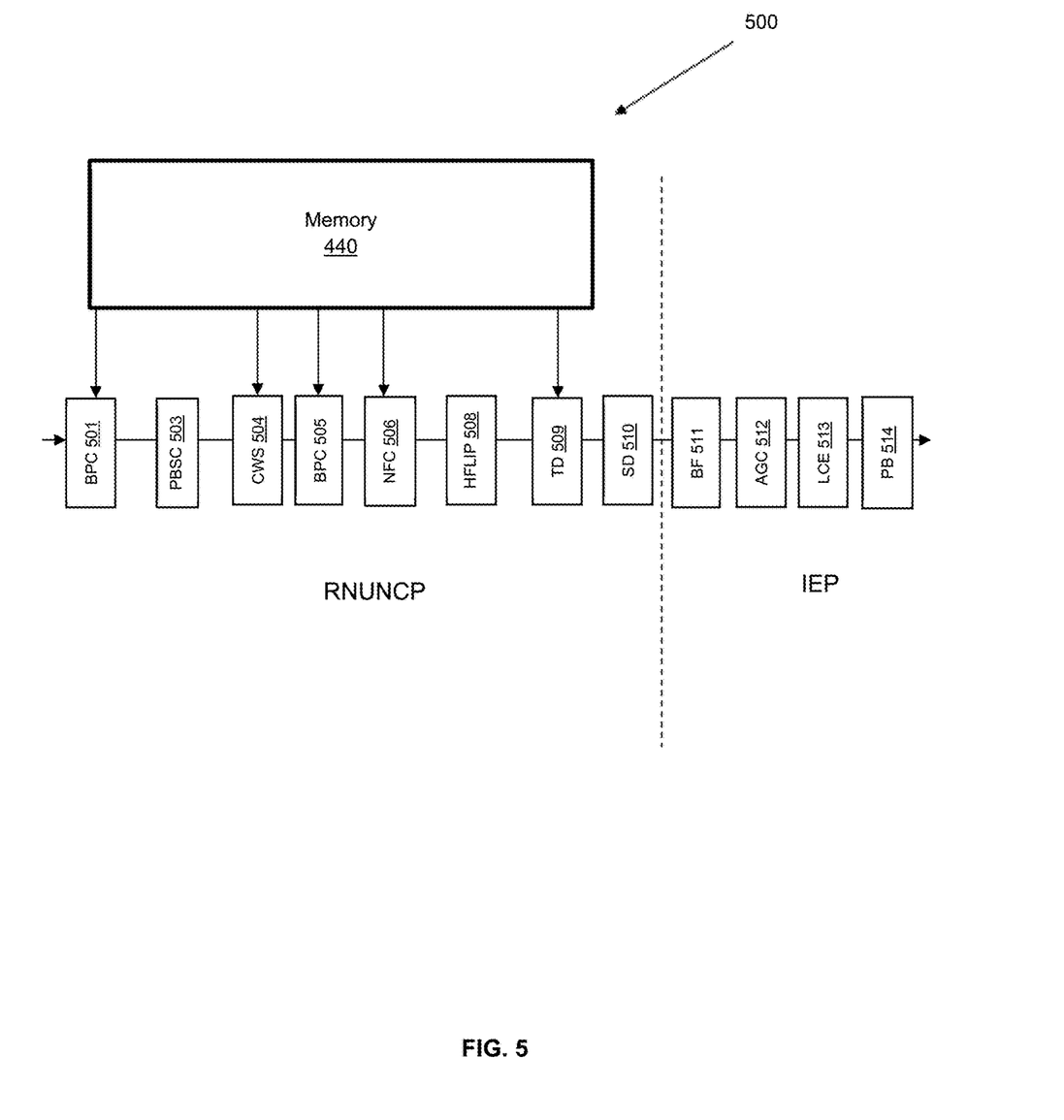
FIG. 5 illustrates a pipeline of processing tasks performed by the IC of FIG. 2 according to an embodiment.

At minimum, the RNUNCP 420 is implemented to perform pixel-based correction, column noise suppression, and near field correction. In an embodiment, the RNUNCP 420 can be configured to perform additional image processing tasks to provide a high-quality thermal video stream that would allow for the accurate detection of objects. The image processing tasks are performed in a pipeline manner by the various engines as described as illustrated in FIG. 5.

The Bad Pixel Correction (BPC) engine 501 is configured to mask pixels designed in a bad pixel map. Such pixels do not meet the basic quality requirements as required by a manufacture of the FIR sensor. The bad pixels in the map can be identified by the manufacture or during a test performed on the FIR sensor at the lab. The bad pixel map is saved in the memory 440.

The Pixel-based Correction (PBC) engine 503 is configured to perform correction of the offset, gain and drift value for each pixel as discussed above. The Column Noise Suppression (CNS) engine 504 suppresses fixed pattern column noise in the FIR image capture by the FIR sensor. The Bad Pixel Correction (BPC) engine 505 attempts to correct bad pixels by approximating each bad pixel using an optimal interpolation based on the pixel predefined number (e.g., 8) of its closest neighboring pixels.

The Near Field Correction (NFC) engine 506 is configured to correct undesired patterns superimposed on the scene image by various physical effects such as reflections of the camera case and lens. Such patterns are modeled during the calibration mode. During the operational mode, the NFC engine 506 identifies a best fit between the pattern and the input image and subtracts the pattern from the image accordingly. The NFC engine 506 handle two such patterns either independently or as a linear combination. The required pattern images and parameters are provided by the processing circuitry 410 at power up and updated when necessary.

The h-flip engine 508 is configured to implement horizontal flip of the received sensor image. In an embodiment, the engine 508 is further configured to clip the pixels' values between minimum and maximum values. These values are pre-configured.

The time denoise (TD) engine 509 is configured to perform time denoising process of infrared video. The video obtained from the FIR sensor 320 contains temporal noise of varying types, such as white noise, salt, and pepper noise (occasional flickering) and row/columns noise. In an embodiment, the engine 509 is realized by an IIR filter with an adaptive threshold, and an anti-flickering mechanism. The time denoise engine 509 compares changes in pixel values from frame to frame to the estimated noise variance, to decide whether such values are caused by noise, or by some actual change in the scenery. Based on the comparison, a signal to noise ratio is determined.

The spatial denoise (SD) engine 510 is configured to denoise spatial noise. Such noise is caused due to internal electronic noise, errors in the pixel gains and offsets and drifts caused by temperature fluctuations. In an embodiment, the engine 510 may further replace each noisy pixel by a weighted average of neighboring pixels. In an embodiment, only pixels having a gray level that is closer to a predefined gray level threshold are replaced.

It should be noted that in certain configurations only some of the engines described are required as part of the processing. The various parameters, maps, and calibration values are not required to operate the various engines and processes stored in the memory 440 and are not illustrated herein merely for the sake of simplicity.

In an example embodiment, the output of the spatial denoise engine 510 is a 14-bit grayscale video stream fed to the server 142 (FIG. 1) and the IEP 430.

Returning to FIG. 4, the IEP 430 processes the 14-bit stream to produce an enhanced thermal video stream that can be seen by a human. In an embodiment, the IEP 430 converts the 14-bit stream to a high quality 8-bit stream that can be efficiently displayed on a screen.

In an embodiment, the IEP 430 includes the engines, shown in FIG. 5, that are configured to perform image enhancement processes. The first engine is a bilateral filter (BF) 511 utilized to edge preserving and noise reduction filter. The Automatic Gain Control (AGC) engine 512 is configured to reduce the influence of empty bins from the gray level range. That is, the engine 512 is configured to reduce the distance between the lowest and the highest gray levels in the image to a minimum without essentially losing information. The dynamic range reduction allows to stretch the image histogram as much as possible.

The Local Contrast Enhancement (LCE) engine 513 is configured to perform a process for Contrast Limited Adaptive Histogram Equalization (CLAHE). In image processing, contrast limited adaptive histogram equalization is a technique used to improve the local contrast of an image. The adaptive histogram equalization is performed to find the mapping for each pixel based on its local (neighborhood) grayscale distribution.

In an embodiment, the LCE engine 513 is configured to divide the image into overlapping blocks to reduce even more the blocking effect. In some cases, when grayscale distribution is highly localized, it may not be desirable to transform very low-contrast images by full histogram equalization. In such cases, the mapping curve may include segments with high slopes, meaning that two very close grayscales might be mapped to significantly different grayscales. This is resolved by limiting the contrast that is allowed through histogram equalization.

The last image processing enhancement engine is the Polarity-and-Brightness (PB) engine 514. In an embodiment, the engine 514 is configured to change between white-hot and black-hot pixels and adjust the brightness of the image's pixels by a predefined offset.

It should be noted that the processing of the various engines shown in FIG. 5 is performed on infrared images input by the FIR sensors 320. The results images are still infrared images (referred herein as "FIR images"). Thus, the processing does not change the nature of the image (e.g., from an infrared to a visible spectrum image), but rather improves the quality of the infrared image.

Referring again to FIG. 4, in an embodiment, the processing circuitry 410 can be a single core or a multiple-core CPU. Each of the RNUNCP 420 and IEP 430 may be realized as one or more hardware logic components and circuits. For example, and without limitation, illustrative types of hardware logic components that can be used include a FPGA, an ASIC, an ASSP, a SOCs, a general-purpose microprocessor, a microcontroller, a DSP, a GPU, and the like, or any other hardware logic components that can perform calculations or other manipulations of information.

Figure 6:
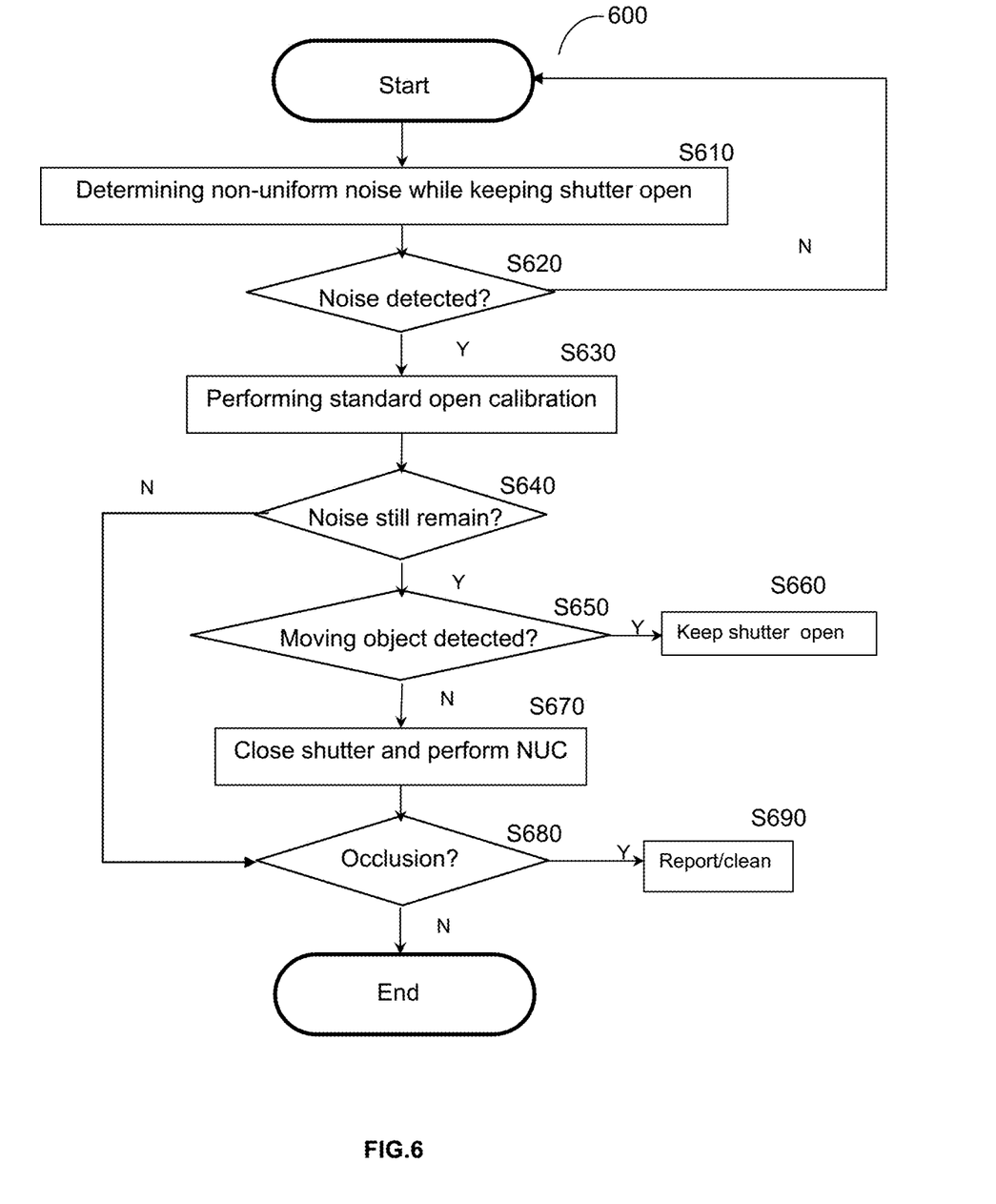
FIG. 6 is a flowchart for a method of operating the V2I communication, according to an embodiment herein.

FIG. 6 is an example flowchart 600 for a method of operating the V2I communication system, according to an embodiment herein. In an embodiment, the method may be performed by the processing circuitry 410 within the IC 330 that is programmed to perform a specific executable code or software.

At S610, with the shutter 210 open, it is detected whether there is non-uniform noise in the images captured by the FIR camera 220. Non-uniformity noise is a noise that is caused by a lack of sensor equalization at the FIR sensor 320. Non-uniform noise may exist in V2I systems because of the stationary FIR device 110 that is fixed on a pole and therefore cannot benefit from motion-based noise suppression algorithms. Temperature changes, dust, and minute position changes due to wind, for example, may introduce noise. If noise is detected at S620, then the method proceeds to S630, where standard calibration may be performed on the FIR camera 220.

Here, standard calibration at S630 may first involve receiving video images, intrinsic calibration, where calibration may include internally at the IC 330, FIR rectification or rectification with additional image modality, such as with LIDAR, or extrinsic calibration performed over the network 140. A calibration engine (not shown) can report a plurality of states, including, idle, processing, completed, processing error, or processing timeout states. Also, the calibration engine may select frames to process according to processing run time, or any heuristic on the image data.

Additionally, calibration may involve geometry calibration, which is based on scene distance measurements that are performed during installation, detection, and range estimation, in order to validate that the FIR is aligned and the FOV is correct.

Then, at S640, it is determined whether the noise still remains. If noise has been removed, the process proceeds to S680. Otherwise, the process proceeds to S650, where it is determined whether there is any moving object detected by the FIR camera 220. If so, the shutter 110 is kept open so that FIR imaging can continue, thus preventing dangerous cases where objects such as vehicles or pedestrians move towards each other when the shutter is closed during additional correction. Otherwise, if no moving object that is approaching the FIR camera 220 is detected by the FIR camera 220, then the process moves to S670.

At S670 the shutter is closed or placed in the field of view of the FIR camera 220 so that the NUC operation may be performed. Here, the shutter 110 presents a uniform temperature source for all detector elements within the FIR, so that the FIR may perform offset correction. This way, a more uniform image results when compared to standard calibration. In another embodiment, NUC may also take place at startup of the FIR imaging.

When the closed-shutter NUC is completed, the process moves to S680, where the shutter is reopened. Here, it is determined whether the field of view of the FIR camera 220 is occluded, such as by dirt. If so, additional cleaning may take place to clean the field of view, or a report can be generated over the network at S690 to warn users that the FIR 220 camera is not functioning correctly, so that the FIR may be serviced manually. After S690, the process ends.

Figure 7:
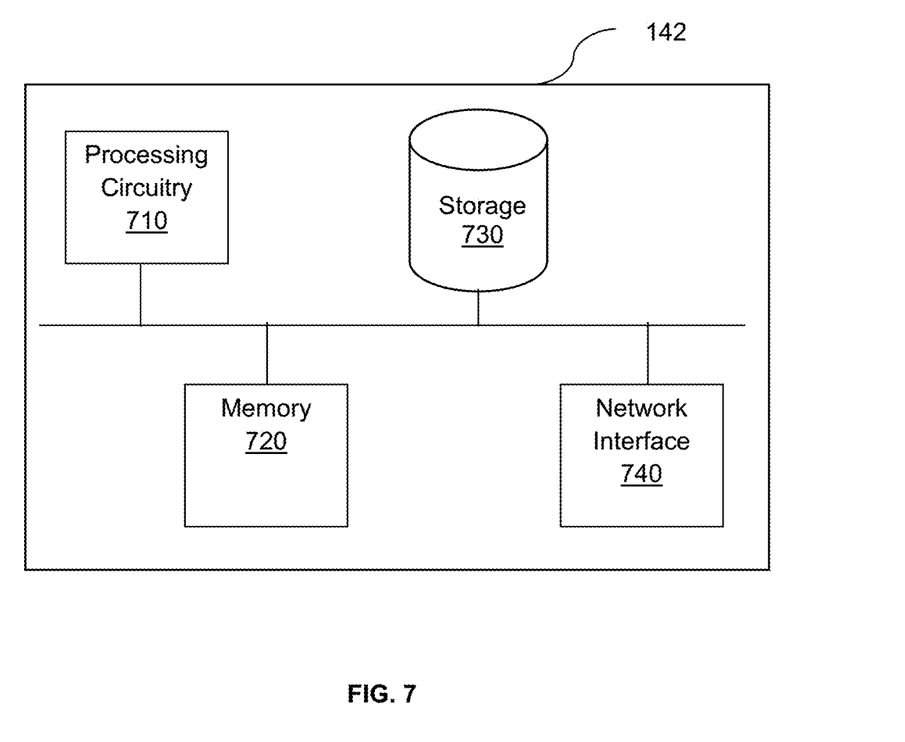
FIG. 7 is a schematic diagram of the V2I communication system, according to an embodiment herein.

FIG. 7 is an example schematic diagram of a server 142 according to an embodiment. The system 142 includes a processing circuitry 710 coupled to a memory 620, a storage 730, and a network interface 740. In an embodiment, the components of the server 142 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 730 may be magnetic storage, optical storage, and the like, and may be realized, for example, as flash memory or other memory technology, CD-ROM, Digital Versatile Disks (DVDs), or any other medium which can be used to store the desired information.

The network interface 740 allows the server 142 to communicate with the IC 230 for the purpose of, for example, receiving data, sending data, and the like. Further, the network interface 740 allows the server 142 to communicate with the display 152 for the purpose of collecting vehicle data.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for operating a vehicle to infrastructure (V2I) system, comprising:
receiving images from an infrared (IR) camera;
determining whether a non-uniform noise exists within the received images;
performing a calibration, upon determining that the non-uniform noise exists;
performing a Non-Uniformity Correction (NUC) on the IR, upon determining that there is residual non-uniform noise, after performing the calibration, and determining that the IR camera has not detected a moving object that is approaching the IR camera;
determining whether a Field of View (FOV) of the IR camera is occluded, after performing the NUC; and
cleaning the IR camera, upon determining that the FOV of the infrared camera is occluded.

2. The method of claim 1, wherein:
the IR camera includes a shutter; and
the shutter is closed over the infrared (IR) camera during the performance of Non-Uniformity Correction (NUC).

3. The method of claim 2, further comprising: keeping the shutter open during the determination of whether the non-uniform noise exists.

4. The method of claim 2, further comprising: keeping the shutter open during the performance of the calibration.

5. The method of claim 1, wherein the calibration including one of: a rectification with another image or a geometric calibration.

6. The method of claim 5, further comprising: performing geometric calibration based on scene distance measurements that are performed during range estimation between the IR camera and the vehicle.

7. The method of claim 1, further comprising:
forming a pixel-based correction to correct one of: unmodeled offset, gain, or drift noise for each pixel within the received images.

8. The method of claim 7, further comprising: correcting the drift noise based on a temperature drift correction for the each pixel within the received images.

9. The method of claim 7, further comprising: correcting the drift noise by calculating a gamma drift coefficient and subtracting a product of predetermined drift value for each pixel and the calculated gamma drift coefficient.

10. A non-transitory computer readable medium having stored thereon instructions for causing a processing circuitry to execute a process, the process comprising:
receiving images from an infrared (IR) camera;
determining whether a non-uniform noise exists within the received images;
performing a calibration, upon determining that the non-uniform noise exists;
performing a Non-Uniformity Correction (NUC) on the IR, upon determining that there is residual non-uniform noise, after performing the calibration, and determining that the IR camera has not detected a moving object that is approaching the IR camera;
determining whether a Field of View (FOV) of the IR camera is occluded, after performing the NUC; and
cleaning the IR camera, upon determining that the FOV of the infrared camera is occluded.

11. A Vehicle to Infrastructure (V2I) system for detecting objects, comprising:
a processing circuitry; and
a memory, the memory containing instructions that, when executed by the processing circuitry, configure the system to:
receive images from an infrared (IR) camera;
determine whether a non-uniform noise exists within the received images;
perform a calibration, upon determining that the non-uniform noise exists;
perform a Non-Uniformity Correction (NUC) on the IR, upon determining that there is residual non-uniform noise, after performing the calibration, and determining that the IR camera has not detected a moving object that is approaching the IR camera;
determine whether a Field of View (FOV) of the IR camera is occluded, after performing the NUC; and
clean the IR camera, upon determining that the FOV of the infrared camera is occluded.

12. The system of claim 11, wherein:
the IR camera includes a shutter; and
the shutter is closed over the infrared (IR) camera during the performance of Non-Uniformity Correction (NUC).

13. The system of claim 12, wherein the shutter is kept open during the determination of whether the non-uniform noise exists.

14. The system of claim 12, wherein the shutter is kept open during the performance of the calibration.

15. The system of claim 11, wherein the calibration including one of a rectification with another image or a geometric calibration.

16. The system of claim 15, wherein the geometric calibration is determined based on scene distance measurements that are performed during range estimation between the IR camera and the vehicle.

17. The system of claim 11, wherein the system is further configured to form a pixel-based correction to correct one of unmodeled offset, gain, or drift noise for each pixel within the received images.

18. The system of claim 17, wherein the drift noise is corrected based on a temperature drift correction for the each pixel within the received images.

19. The system of claim 17, wherein the drift noise is corrected by calculating a gamma drift coefficient and subtracting a product of predetermined drift value for each pixel and the calculated gamma drift coefficient.

20. The method of claim 1, wherein the non-uniform noise existing in the images from the IR camera is caused by at least one of temperature change and position change due to wind impacting on the IR camera.

* * * * *